(12) United States Patent
Campbell

(10) Patent No.: US 8,955,828 B2
(45) Date of Patent: Feb. 17, 2015

(54) SPRINGLESS ELECTRIC GATE TENSIONER

(76) Inventor: Robert J. A. Campbell, Lebanon, VA (US)

( * ) Notice: Subject to any disclaimer, the term of this patent is extended or adjusted under 35 U.S.C. 154(b) by 162 days.

(21) Appl. No.: 13/474,387

(22) Filed: May 17, 2012

(65) Prior Publication Data

US 2012/0295468 A1 Nov. 22, 2012

Related U.S. Application Data

(60) Provisional application No. 61/488,013, filed on May 19, 2011.

(51) Int. Cl.
*A01K 3/00* (2006.01)

(52) U.S. Cl.
USPC .............................................. 256/10; 256/32

(58) Field of Classification Search
USPC ............ 256/10, 37, 39, 32, 47; 439/314, 316, 439/649; 403/348, 349
See application file for complete search history.

(56) References Cited

U.S. PATENT DOCUMENTS

| | | | | |
|---|---|---|---|---|
| 11,378 | A * | 7/1854 | Lauers | 256/47 |
| 505,032 | A * | 9/1893 | Curry | 200/79 |
| 733,936 | A * | 7/1903 | Barrett | 256/39 |
| 1,083,542 | A * | 1/1914 | Knauff | 439/649 |
| 1,199,690 | A * | 9/1916 | Gillan | 403/348 |
| 1,263,050 | A * | 4/1918 | Fargu | 403/349 |
| 1,369,635 | A | 2/1921 | Douglas | |
| 2,306,661 | A | 12/1942 | Gengler | |
| 2,307,386 | A * | 1/1943 | Braxton | 403/349 |
| D160,244 | S | 9/1950 | Blandin | |
| 3,016,229 | A | 1/1962 | Jacobson | |
| 3,684,248 | A | 8/1972 | Maes, Jr. | |
| 4,040,604 | A | 8/1977 | Langlie et al. | |
| 4,361,374 | A * | 11/1982 | Marmillion et al. | 439/314 |
| 4,369,551 | A * | 1/1983 | Heredia | 24/656 |
| 6,257,558 | B1 | 7/2001 | Levine et al. | |
| 2010/0011593 | A1 | 1/2010 | Trbovich, Jr. et al. | |
| 2010/0136801 | A1 | 6/2010 | Limpkin et al. | |

* cited by examiner

*Primary Examiner* — Michael P Ferguson
(74) *Attorney, Agent, or Firm* — Richard C Litman

(57) ABSTRACT

The springless electric gate tensioner receptacle and plug connect and axially adjust relative to each other in order to mechanically tension the electrical fence gate wire. The receptacle has a resilient, electrically non-conductive insulator covering handle and conductive sleeve portions. Spaced apart bayonet slots are disposed axially along diametrically opposite sides of the sleeve. The plug includes a solid cylindrical conductive member extending from a handle, the handle being covered with a resilient, electrically non-conductive insulator. Bayonet lugs extend from the plug near its end and project outwardly in a radial direction approximately 180° from each other. Conducting rings extend from the plug and receptacle handles for connection to the gate and fence wires. The projecting bayonet lugs of the plug twist-lock engage user selectable receptacle slots, thereby tensioning the gate wire.

3 Claims, 4 Drawing Sheets

SPRINGLESS ELECTRIC GATE TENSIONER

CROSS-REFERENCE TO RELATED APPLICATION

This application claims the benefit of U.S. Provisional Patent Application Ser. No. 61/488,013, filed May 19, 2011.

BACKGROUND OF THE INVENTION

1. Field of the Invention

The present invention relates to electrified fences, and particularly to a springless electric gate tensioner.

2. Description of the Related Art

Electrified fences usually have a type of resilient connector that mechanically tensions the shock wire when connected, yet allows authorized persons, such as farm personnel, to disconnect the connector to allow for passage through designated areas of the fence border without getting shocked. These connectors are usually spring-tensioned and have a metal hook attached to the fence wire on either side of the connector. A constant problem with this type of connector is that when a stray animal or would-be intruder bangs up against the connector, the spring inside the connector is broken or stretched, making the connector useless in maintaining good electromechanical connection or for maintaining the wire at an effective height above the ground. This requires time-consuming replacement, which often first necessitates a trip to the circuit breaker to de-energize the wire before repair.

There exists a long-felt need for a better connector apparatus. Thus, a springless electric gate tensioner solving the aforementioned problems is desired.

SUMMARY OF THE INVENTION

The springless electric gate tensioner has first and second substantially cylindrical members that connect and axially adjust relative to each other in order to mechanically tension the electrical fence gate wire. The first member is a receptacle connector that has a resilient, electrically non-conductive insulator covering both handle and sleeve portions thereof. The electrically conductive sleeve portion is hollow and cylindrical. Diametrically opposed central channels extend axially from the open end of the sleeve towards the handle for a portion of the length of the sleeve. A plurality of spaced apart bayonet slots extend along one side of each of the channels, the bayonet slots slanting or curving back towards the open end of the sleeve in the same angular direction. A first electrically conducting ring or eyelet extending from the handle is electromechanically connected to the sleeve of the receptacle.

The second member is an electrically conductive plug that inserts into the first member. The plug is a solid, cylindrical member that extends from a handle, the handle being covered with a resilient, electrically non-conductive insulator. Bayonet lugs extend from the solid tubular member near its end and project outwardly in a radial direction approximately 180° from each other. A second electrically conducting ring or eyelet extends from the plug handle and is electromechanically connected to the solid portion of the plug. The two rings (eyelets) provide conductive attachment points for connecting the electrified gate wire on either side of the connectors. The projecting bayonet lugs of the second member (plug) can twist-lock engage a user-selectable pair of the bayonet slots of the first member (receptacle) in a bayonet-type connection that permits the length of the connector to be adjusted, thereby tensioning the gate wire.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
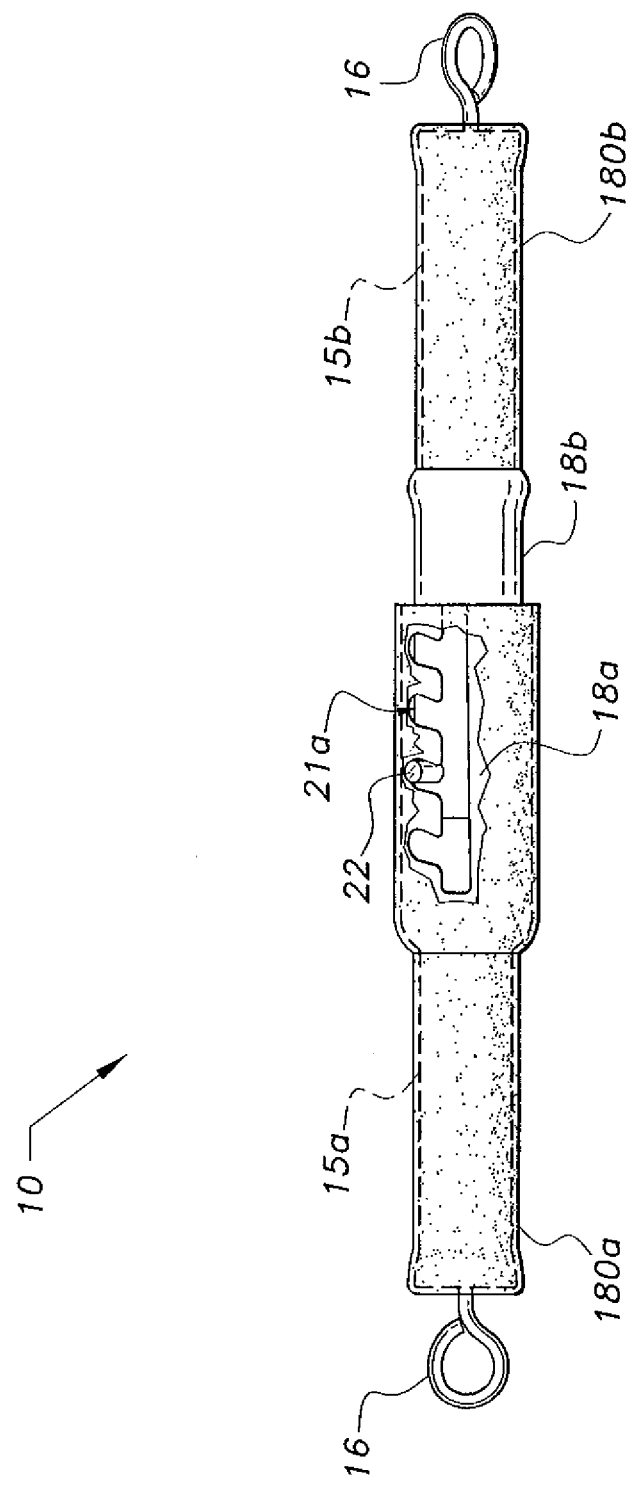
FIG. 1 is a right side elevational view of a springless electric gate tensioner according to the present invention, the insulation being broken away to show details of the bayonet-type connector.
Figure 2:
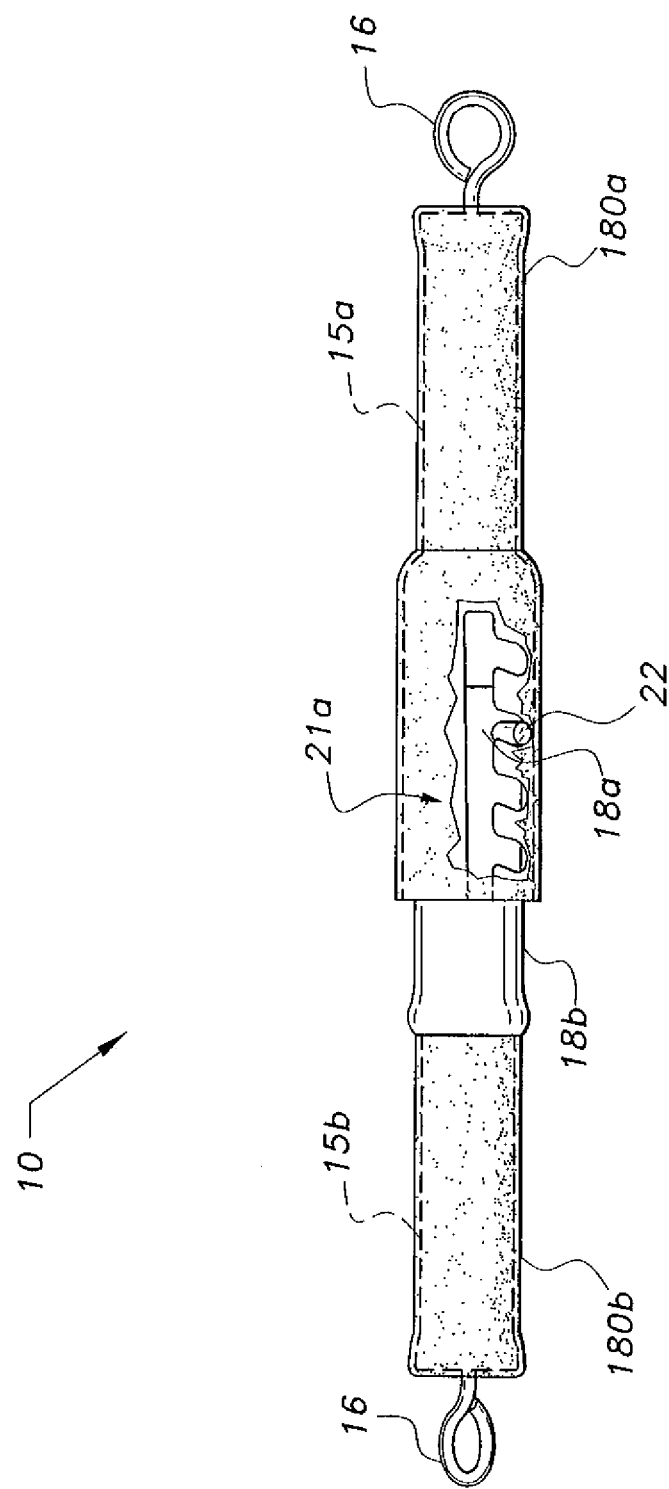
FIG. 2 is a left side elevational view of the springless electric gate tensioner of FIG. 1, the insulation being broken away to show details of the bayonet-type connector.
Figure 3:
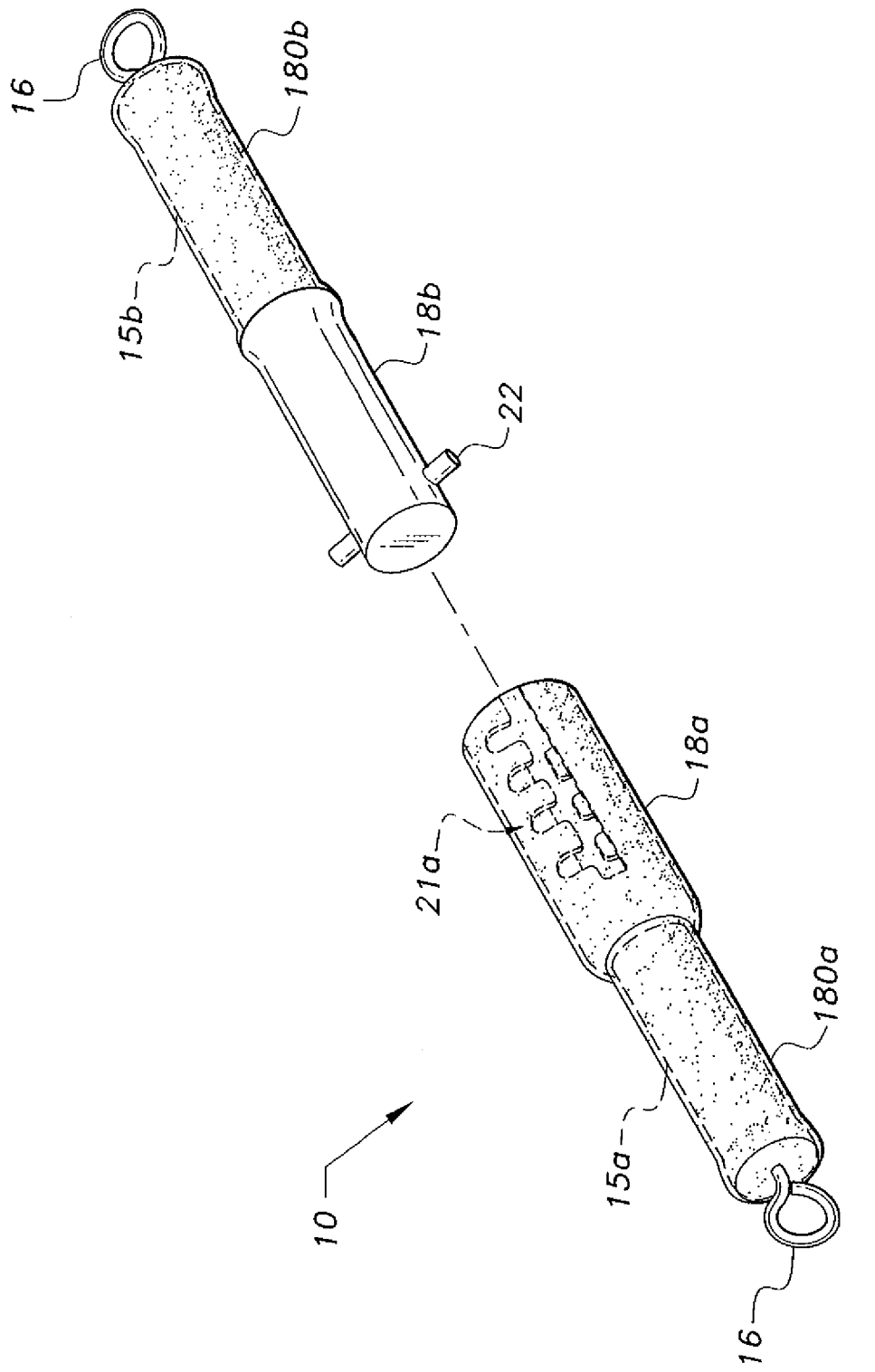
FIG. 3 is a partially exploded perspective view of the springless electric gate tensioner of FIG. 1.
Figure 4:
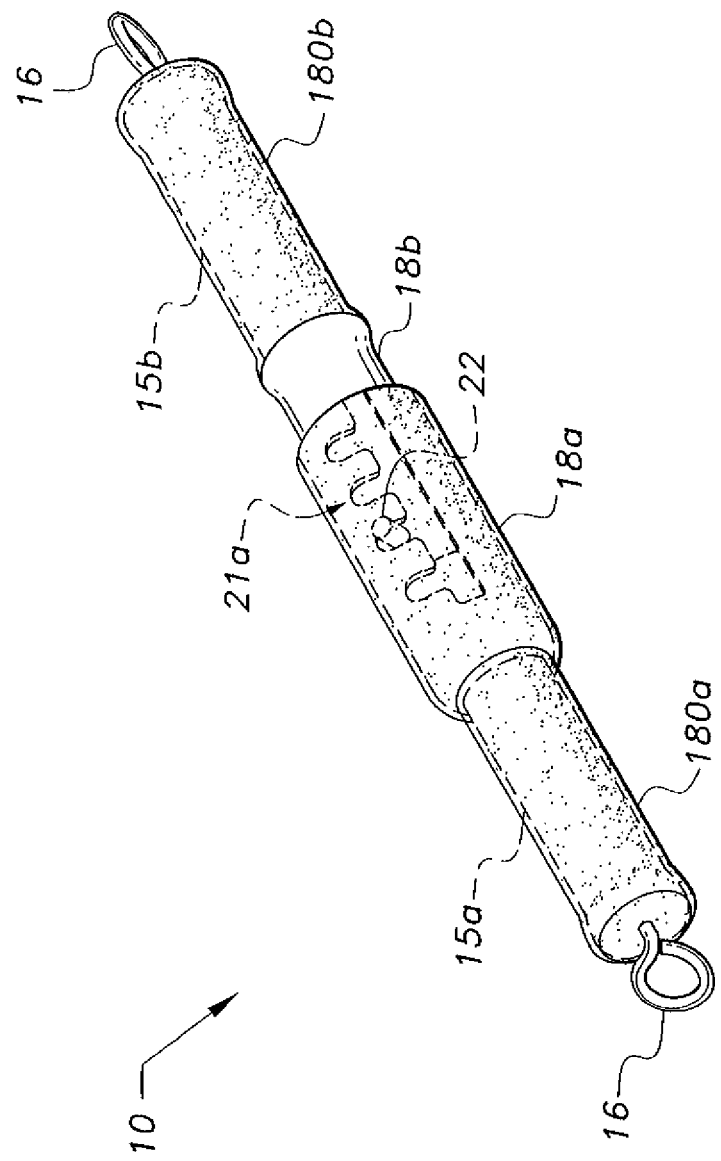
FIG. 4 is a perspective view of the springless electric gate tensioner of FIG. 1.

As shown in FIGS. 1 through 4, the springless electric gate tensioner 10 has first and second substantially cylindrical, axially adjustable electric fence wire connectors that mechanically tension electrical fence gate wire while maintaining an electrical connection between the two connecting ends. The first connector includes a metal, electrically conductive, cylindrical bayonet-slotted sleeve 18a that extends from and is axially aligned with a handle 15a. A resilient (e.g., rubber or polymer) electrically non-conductive insulator 180a covers both the handle 15a and the sleeve 18a receptacle portions. The sleeve 18a has diametrically opposed central channels extending from the open end of the sleeve 18a towards the handle 15a for a portion of the length of the sleeve 18a. A plurality of spaced-apart bayonet slots 21a or detent slots slant at an angle or an arc from one side of each of the central channels in the same angular direction. Alternatively, only a single central channel is disposed in the sleeve, the bayonet slots extending therefrom.

The second connector includes a solid metal, electrically conductive, plug 18b that extends from and is axially aligned with a handle 15b, the plug 18b being dimensioned and configured to fit snugly inside the sleeve member 18a when inserted therein. Bayonet lugs 22 extend from the solid plug 18b near the end opposite the handle 15b and project outward from the solid plug 18b in a radial direction substantially 180° opposite from each other. The handle 15b is covered with a resilient, electrically non-conductive insulator 180b. The sleeve 18a forms a barrel having slotted openings defining entrances to the two central channels for passage of the bayonet lugs 22 therethrough. Where there is only one channel in the receptacle, only a single bayonet lug need extend from the solid plug.

Conductive metal eye-screws (bolts) 16 each have a shank that extends through the handles 15a and 15b and are electromechanically connected to the sleeve 18a and to the plug 18b, respectively. The eye-screws 16 have ring-shaped ends that facilitate the connection of electric fence gate wire to the connectors of tensioner device 10, either by connecting the wires directly to the rings, or by terminating the wires in a snap hook or other connector that can engage the rings.

As the solid plug member 18b is inserted into the sleeve member 18a, the bayonet lugs 22 of the solid tube member 18b can engage bayonet slots 21a and 21b in a twist-lock, bayonet-type connection. The user selects which pair of bayonet slots 21a and 21b is engaged by the bayonet lugs 22, thus permitting the length of the connector to be adjusted, and thereby tensioning any attached gate wires accordingly. In the event that a stray animal or would-be intruder bangs up against and breaks the fence-wire connected to the device 10, it is an easy task to detach the receptacle 18a from the plug 18b and then reattach the wire to the ring end of the eye-screw 16 that the wire was dislodged from. The plug 18b can then be re-inserted and locked into the receptacle 18a at whatever depth is required to tension the wire. Due to insulation 180a and 180b, the user need not de-energize the wires before repairing the connector.

It is to be understood that the present invention is not limited to the embodiments described above, but encompasses any and all embodiments within the scope of the following claims.

I claim:

1. A springless electric gate tensioner, comprising:
a female connector having:
  an elongate, cylindrical sleeve having an open end and a pair of central channels extending axially from the open end along a portion of the sleeve diametrically opposite each other, the central channels each having a plurality of axially spaced apart bayonet slots extending from one side of the channels in the same angular direction;
  a sleeve handle extending from the sleeve opposite the open end;
  a ring terminal extending from the sleeve handle for fastening to fence wire, the ring terminal being electrically connected to the sleeve; and
  a resilient insulator cover disposed over the sleeve handle and the sleeve; and
a male connector having:
  a cylindrical plug having a free end and a pair of lugs extending transversely from diametrically opposite sides of the plug adjacent the free end, the plug being insertable into the sleeve and lugs being slidable in the central channels and into a user selectable pair of the bayonet slots to lock the male connector and the female connector together at a user-adjustable length when the plug is twisted inside the sleeve;
  a plug handle extending from the plug opposite the free end;
  a ring terminal extending from the plug handle for fastening to fence wire, the ring terminal being electrically connected to the plug; and
  a resilient insulator cover disposed over the plug handle and the plug;
wherein the lugs selectively engage specific ones of the bayonet slots to adjust the length of the plug extending into the sleeve, thereby tensioning fence wire fastened to opposite ends of the tensioner while maintaining electrical conduction through the fence wire.

2. A springless electric gate tensioning device, comprising:
a hollow, substantially cylindrical, electrically conducting receptacle connector having an insertion channel having an open end extending axially therein, the insertion channel having a plurality of axially spaced-apart bayonet slots extending therefrom;
a receptacle connector handle extending axially from the receptacle connector;
a resilient, electrically non-conductive insulator covering the receptacle connector handle;
first electrically conducting means extending axially from the receptacle handle and being electrically connected to the substantially cylindrical receptacle connector for fastening to fence wire;
an elongate cylindrical electrically conducting plug slidable into the hollow receptacle connector;
a plug handle extending axially from the plug;
an electrically non-conductive insulator covering the plug handle;
a bayonet lug extending from the plug near the end of the plug distal from the plug handle, the lug projecting radially outward from the cylindrical plug; and
second electrically conducting means extending axially from the plug handle and being electrically connected to the cylindrical plug for fastening to fence wire;
wherein the lug is slidable into the insertion channel and selectively engages a specific one of the bayonet slots to adjust the length of the plug extending into the receptacle connector when the plug is twisted inside the receptacle connector, thereby tensioning fence wire fastened to opposite ends of the device while maintaining electrical conduction through the fence wire.

3. A springless electric gate tensioning device, comprising:
a hollow, substantially cylindrical, electrically conducting receptacle connector having an insertion channel having an open end extending axially therein, the insertion channel having a plurality of axially spaced-apart bayonet slots extending therefrom;
a receptacle connector handle extending axially from the receptacle connector;
a resilient, electrically non-conductive insulator covering the receptacle connector handle;
a first electrically conducting eye screw extending from the receptacle handle, the eye screw having an eye adapted for fastening fence wire thereto and a threaded shank extending into and through the receptacle handle and contacting the cylindrical receptacle connector to make electrical contact therewith;
an elongate cylindrical electrically conducting plug slidable into the hollow receptacle connector;
a plug handle extending axially from the plug; an electrically non-conductive insulator covering the plug handle;
a bayonet lug extending from the plug near the end of the plug distal from the plug handle, the lug projecting radially outward from the cylindrical plug; and
a second electrically conducting eye screw extending from the plug handle, the second eye screw having an eye adapted for fastening fence wire thereto and a threaded shank extending into the plug handle and contacting the cylindrical plug to make electrical contact therewith;
wherein the lug is slidable into the insertion channel and selectively engages a specific one of the bayonet slots to adjust the length of the plug extending into the receptacle, connector when the plug is twisted inside the receptacle connector, thereby tensioning fence wire fastened to opposite ends of the device while maintaining electrical conduction through the fence wire.

* * * * *